April 19, 1949.　　　G. B. LOPER　　　2,467,624

SIGNAL TRANSMISSION CIRCUIT FOR SEISMOGRAPHS

Filed March 20, 1946

INVENTOR.
GEORGE B. LOPER
BY
Sidney A. Johnson
ATTORNEY

Patented Apr. 19, 1949

2,467,624

UNITED STATES PATENT OFFICE 2,467,624

SIGNAL TRANSMISSION CIRCUIT FOR SEISMOGRAPHS

George B. Loper, Dallas, Tex., assignor, by mesne assignments, to Socony-Vacuum Oil Company, Incorporated, New York, N. Y., a corporation of New York Application March 20, 1946, Serial No. 655,661

3 Claims. (Cl. 179—171)

The present invention relates to a control circuit for amplifiers, and more particularly to a signal transmission circuit for use with electric seismographs.

In seismic prospecting systems, it is customary to detonate a charge of explosive in a shot hole to produce seismic waves which are reflected from the sub-surface horizons and interfaces. These reflected waves are attenuated by their travel through the underground strata so that reflected waves from the deeper interfaces have greater attenuation. The different densities and sub-surface strata also play a part in determining the attenuations.

The reflected waves are picked up at different points from the shot hole by a plurality of detectors or geophones generally referred to as a "spread." The reflected waves reach the different geophones at different times so that a recording of the reception of such waves by the geophone on a seismic oscillograph will provide the necessary data from which computations may be made to plot the contour of the different strata reflecting the waves.

The time of arrival of such first wave is ascertained by the beginning of the movement of the oscillographic element from its neutral position, and in order to increase the accuracy of the determination of the initial movement of the galvanometer, it has been customary to have the amplifier set at maximum gain. With such high gain of the amplifier, the initial movement of the galvanometer element produces a sharp break in the seismogram thereby minimizing any necessity to estimate the precise instant at which the oscillograph elements start to move.

Subsequent to the initial direct wave, the reflected waves are received which over a period of time are progressively attenuated. Since the initial reflected waves are of higher amplitude, it has been customary to reduce the gain of the amplifier and thereafter to increase the gain of the amplifier as a function of time. It has been found, however, that certain systems thus far provided for the arbitrary increase of the gain of the amplifier as a function of time, operate in a manner so as to introduce a modulation or distortion of the received waves. It, therefore, would be desirable to provide an amplitude control for the amplifier which would provide a wide variation of attenuation with no unwanted signal introduced by the amplitude control voltage. In accordance with the present invention, an electronic amplitude control is provided for the amplifier which provides a wide variation in signal control for relatively large signal amplitudes without distortion and by means of a cercuit arrangement of relatively simple design requiring the minimum number of circuit elements. This is accomplished by the use of a bridge network which is capable of controlling signal amplitude from a limiting value of zero to the maximum without addition of a signal by the control voltage.

It, therefore, is an object of the present invention to provide an improved signal transmission circuit for controlling the amplitude of transmitted signals.

It is a further object of the present invention to provide an improved circuit for controlling the amplitude of signals in a seismographic recording system.

Further objects and advantages of the invention will become apparent from the following description taken in conjunction with the accompanying drawing, in which.

Figure 1:
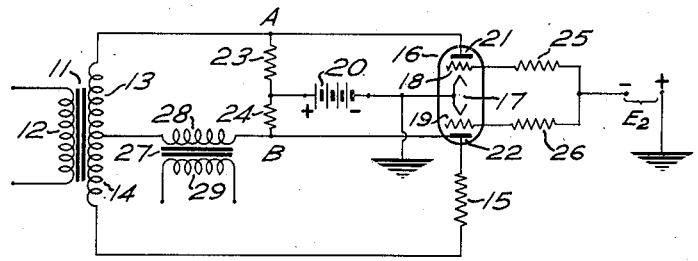
Fig. 1 is a circuit diagram of the signal controlling bridge network constructed in accordance with the present invention.

The circuit shown in Fig. 1 employs a transformer 11 having a primary input winding 12 which is to be connected to a source of signals which might be a geophone. The transformer 11 is provided with a pair of secondary windings 13 and 14 which may be arranged as a single midtap winding. The secondary windings 13 and 14 each constitute adjacent arms of a bridge network. The arm 14 is adjacent to another arm 15 comprising an impedance or a resistor. The remaining arm of the bridge includes a pair of vacuum tubes connected in opposition so that the cathodes thereof are connected together, and the anodes are connected to adjacent corners of the bridge. A double triode contained in a single envelope may be employed although two similar matched triodes may also be used. In the circuit shown, a single envelope vacuum tube 16 has been illustrated having a cathode structure 17, a pair of grids 18 and 19, and a pair of anodes 21 and 22. The anode 21 is connected to the upper terminal of the secondary transformer winding 13 and the other anode 22 is connected to the impedance or resistor 15. Between the anodes 21 and 22 are connected a pair of impedances or resistors 23 and 24, the midpoint being connected to a positive terminal of a source B of anode potential.

It, therefore, is apparent that the fourth arm of the bridge network includes the impedances or resistors 23 and 24 which are adapted to be shunted by the two triode portions of the vacuum tube 16. The net impedance of the fourth arm of the bridge may be varied by varying the potential on the grids 18 and 19. The grids 18 and 19 are provided with similar grid resistors 25 and 26 which are connected together to a source $E_2$ of amplitude-controlling biasing potential. The bridge network is provided with an output circuit connected across the remaining diagonal of the bridge which may be in the form of a transformer 27 having a primary winding 28 and an output secondary winding 29.

When the circuit shown in Fig. 1 has the bias of the vacuum tubes so adjusted that they present an impedance sufficient to balance the bridge, no output energy will be obtained across the secondary winding 29 of the transformer 27. By varying the impedance of the vacuum tube portion of the bridge, the bridge is unbalanced so that signal energy may be obtained from the output circuit including the secondary transformer winding 29. The variations of the bias control voltage applied to the grids 18 and 19 from zero to values negative with respect to ground, cause the output amplitude obtained across the transformer winding 29, for a constant signal input for the transformer winding 12, to be reduced throughout the entire range without noticeable distortion or phase shift toward a limiting value of zero as the tubes are rendered non-conductive. The limiting value of the minimum control is dependent upon the degree of perfection of the bridge balance when the vacuum tubes are non-conductive. By careful selection of the circuit resistors and matching of the triodes, the DC potentials appearing at opposite ends of the resistors 23 and 24 may be made to vary in unison as the bridge control voltage is varied, thus providing a control of the output signal free from unwanted signal introduced by the gain control voltage.

Figure 2:
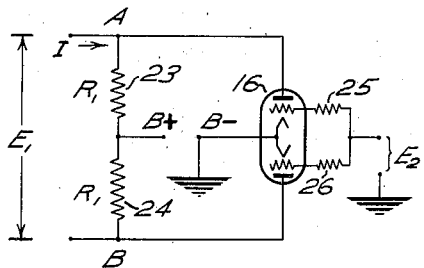
Fig. 2 is an equivalent circuit explanatory of the operation of a portion of the circuit shown in Fig. 1.
Figure 3:
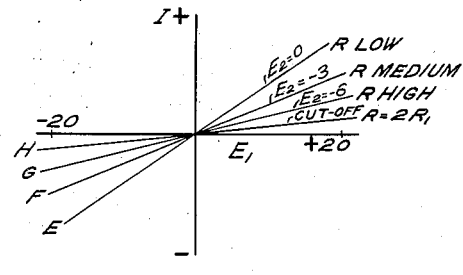
Fig. 3 is a graphical representation illustrating the characteristics of operation as obtained by a circuit such as shown in Fig. 2.

The functioning of the circuit shown in Fig. 1 depends upon the change in the net impedance or resistance of the bridge arm AB as the bias voltage of the vacuum tubes is varied. The circuit shown in Fig. 2 shows the one arm AB of the bridge in Fig. 1. In the circuit shown in Fig. 2, a variable direct-current voltage $E_2$ was applied to the grids of the vacuum tube 16 and a variable direct-current voltage $E_1$ was supplied to the anodes. The resultant plate current I was recorded for various values of each of these voltages and the results plotted as shown in Fig. 3. From this figure it will be seen that the relationship between the anode voltage $E_1$ (as abscissae) and the current flow I (as ordinates) is linear. For the first curve E, the effective resistance R of the bridge arm AB is relatively low with an applied grid voltage $E_2$ equal to zero. For the next curve F, the effective resistance of the arm is at an intermediate value with a control voltage $E_2$ of —3 volts. For the curve G, for the application of —6 volts for $E_2$, the effective resistance becomes relatively high. For the curve H, the resistance of the arm AB is at a maximum and its resistance is substantially equal to the sum of the resistors $R_1$ which are the resistors 23 and 24 of Fig. 1. This latter condition is obtained when the triodes of the vacuum tube 16 are biased to cutoff. In the described arrangement, the tube 16 was a 6C8–G, the resistors 25 and 26 were each one megohm, while the resistors 23 and 24 were each 250,000 ohms. The tube type and the circuit constants are to be taken as suggestive and not by way of limitation since other suitable ones may of course be utilized.

It is further emphasized that the anode current from the source 20 divides and flows from the juncture of resistors 23 and 24 in opposite directions. Since the currents remain equal in magnitude because of simultaneous and like variations of the grid voltages, the potetnial differences across resistors 23 and 24 cancel out. Therefore, for all variations of anode current, or more importantly for all values of resistance of the triodes of tube 16, no difference in potential appears across the arm AB due to variation of the potentials or voltages applied to the grids of the triodes. As far as the bridge itself is concerned, the effect is one of varying the balance of the bridge to control the amplitude transmission thereof as between its input and output circuits without introduction of a signal due to the change in the grid voltage of the triodes of the tube 16.

Figure 4:
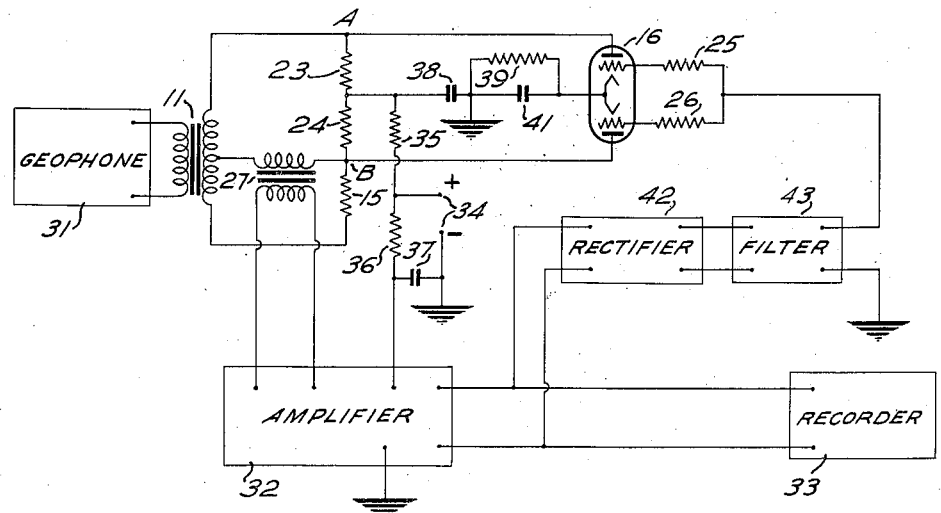
Fig. 4 shows the application of a circuit of the present invention to a seismographic recording system.

Fig. 4 shows the application of the present invention to a seismographic recording system employing a geophone 31 connected to the input transformer 11 of the bridge network. The bridge network components have been given similar reference characters where those components correspond to the ones shown in Fig. 1. The bridge network output transformer 27 is connected to the input of an amplifier 32 which has its output connected to a recorder 33 which generally consists of a seismographic oscillograph. A suitable anode voltage is supplied to the anodes of the vacuum tube 16 from a source of potential connected across the terminals 34. From the positive terminal a series resistor 35 is connected to the juncture between the resistors 23 and 24 of the bridge arm AB. The source of potential connected to the terminals 34 also supplies potential through a resistor 36 to the amplifier 32. The resistor 36 is provided with a by-pass capacitor 37. The resistor 35 is provided with a by-pass capacitor 38. The cathodes of the vacuum tube 16 are provided with a biasing resistor 39 which is by-passed by a capacitor 41.

The potential of the output of the amplifier 32 is supplied to a rectifier 42, the output of which is connected to a filter 43. The filter 43 is connected between ground and the common juncture of the grid resistors 25 and 26 of the vacuum tube 16. For the purposes of explaining the operation of the circuit shown in Fig. 4, it may be assumed that the initial condition of operation of the bridge network is such that a low value of biasing voltage has been applied to the vacuum tube 16 so that the bridge arm AB has a reduced resistance value. In order that the initial ground wave may produce a sharp break in the seismogram made by the recorder 33, the amount of energy supplied to the input of the amplifier 32 should be at a high value. This is obtained by a maximum unbalance of the bridge network by reducing the effective resistance of the arm AB. Thus, it may be assumed that the initial ground wave passes through the amplifier 32 to the recorder 33 to produce a sharp break in each of the curves recorded by the recorder 33. This high energy value appearing at the output of the amplifier 32 is impressed upon the rectifier 42 which produces a direct-current bias passing through the filter 43 which thereupon is equally applied to the grid circuits of the vacuum tube triodes of tube 16. This high value of bias therefore sharply reduces the transmission in the bridge network so that the amount of energy thereafter permitted to pass through the network to the amplifier 32 is at a low level. Thus, the succeeding waves picked up by the geophone, which generally are of high amplitude, reach the amplifier 32 with their amplitude reduced for recording within the desired limits of the seismogram.

Since the output of the amplifier 32 for the later signals is not as great as previously, the energy supplied to the rectifier 42 is reduced, and hence the bias supplied to the grids of the triodes in the bridge arm AB is reduced, thereby increasing the degree of signal transfer by the bridge network. As the succeeding waves decrease in amplitude, the signals produced by the amplifier 32 also decrease, thereby supplying lesser amounts of energy to the rectifier 42, thus resulting in lesser bias values as applied to the triodes of the bridge arm AB. The circuit constants are so arranged that the signal output of the amplifier 32 for this period of operation produces substantially constant deflections of the oscillographs of the recorder 33.

In the foregoing explanation, it has been assumed that the operation of the bridge network shown in Fig. 1 as applied to the system shown in Fig. 4 was initially adjusted so that an application of bias potential to the vacuum tubes would cause the bridge network upon an increasing bias potential to reduce the amplitude of the signals transferred by it. If, however, the direct-current bias supplied to the vacuum tubes of the bridge arm AB were reversed in polarity so that the grids of the triodes are less negative with respect to ground, the effect of the bridge network would be inverse so as to cause it to operate as a volume expander instead of a volume compressor. It will therefore be appreciated that the circuit arrangement shown is susceptible of other applications and that it may be used either to increase or decrease the value of the transmitted signals, depending upon the requirements of the particular application of the invention.

It furthermore will be appreciated that, while the bridge network has been shown as applied as a link between a source of signals and an amplifier in Fig. 4, the circuit could be incorporated as a part of the amplifier or may be located between several stages of the amplifier. It will also be appreciated that a direct-current bias supplied to the vacuum tubes of the bridge network might be obtained from another source other than the rectifier 42.

While for the purpose of illustrating and describing the present invention certain specific circuit arrangements and certain applications of the circuit have been shown in the drawing, it is to be understood that the invention is not to be limited thereby since such variations in the circuit arrangements, in the instrumentalities employed therein, and in the application of the circuit are contemplated as may be commensurate within the spirit and scope of the invention set forth in the following claims.

What is claimed is:

1. A signal transmission circuit comprising a bridge circuit having means for applying input signals across one diagonal thereof, means responsive to output signals from the other diagonal thereof and means for controlling the amplitude of said output signals comprising a pair of impedances connected in series with each other in one arm of said bridge, a pair of vacuum tubes, a source of anode potential, said tubes having their anodes connected to the respective ends of said arm of said bridge and the cathodes thereof connected to one side of said source of potential, and the other side of said source of anode potential being connected to the juncture of said impedances for the flow of anode current through said impedances in opposite directions, and means for simultaneously varying in the same direction the conductivity of said tubes to change the impedance of said arm without changing the value of the potential across said arm due to said anode source, the variation in said impedance of said arm producing pure amplitude control of said output signals.

2. A signal transmission means comprising a bridge circuit having means for applying input signals to one diagonal, means responsive to output signals from the other diagonal thereof, means for controlling the amplitude of said output signals comprising a pair of resistors of equal resistance connected in series with each other in one arm of said bridge, a pair of vacuum tubes and a source of anode potential therefor, said tubes having their anodes connected to the respective ends of said arm of said bridge and the cathodes thereof connected to one side of said anode potential and the other side of said source of anode potential being connected to the juncture of said resistors for the flow of anode current through said resistors in opposite directions, and means for simultaneously varying in the same direction the conductivity of said tubes to change the resistance of said arm without producing a change in the potential across said arm due to a changed flow of anode current therethrough, the variation in said impedance of said arm producing pure amplitude control of said output signals.

3. The combination with an amplifier and a source of variable signals of a bridge circuit connected across one diagonal to the source of signals and connected across the other diagonal to the input of said amplifier, said bridge circuit including an arm having a pair of vacuum tubes connected therein for flow of current in opposite directions, an anode circuit for each of said vacuum tubes including an impedance for flow of anode current, a common source of anode potential connected to said impedances and between them and the respective cathodes of said vacuum tubes, and a source of grid-biasing potential for said tubes varying proportionately to the amplitude of signals transmitted to the amplifier.

GEORGE B. LOPER.

REFERENCES CITED

The following references are of record in the file of this patent:

UNITED STATES PATENTS

| Number | Name | Date |
|---|---|---|
| 2,247,468 | Barr | July 1, 1941 |
| 2,303,357 | Hoover | Dec. 1, 1942 |
| 2,303,358 | Hoover | Dec. 1, 1942 |
| 2,307,790 | Hoover | Jan. 12, 1943 |
| 2,310,342 | Artzt | Feb. 9, 1943 |
| 2,372,243 | Wulfsberg | Mar. 27, 1945 |